Figure 1:
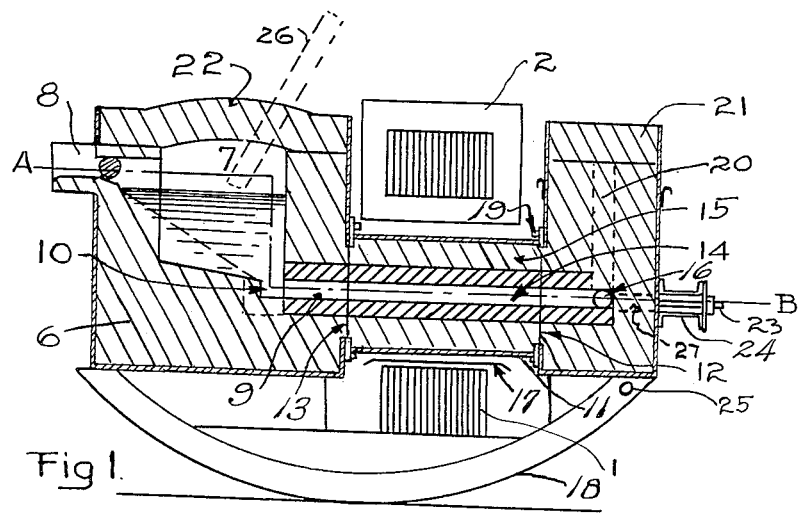

March 29, 1932.                A. E. GREENE                1,851,575
                        ELECTRIC INDUCTION FURNACE
                        Filed Dec. 3, 1928          2 Sheets-Sheet 1

INVENTOR

March 29, 1932.  A. E. GREENE  1,851,575
ELECTRIC INDUCTION FURNACE
Filed Dec. 3, 1928  2 Sheets-Sheet 2

INVENTOR

Patented Mar. 29, 1932

1,851,575

UNITED STATES PATENT OFFICE

ALBERT E. GREENE, OF MEDINA, WASHINGTON

ELECTRIC INDUCTION FURNACE

Application filed December 3, 1928. Serial No. 323,515.

My present invention relates to an improvement in induction furnace operation and apparatus therefor.

Induction furnaces prior to my invention described in this application were not suited for melting cold loose metal scrap. They did not provide sufficient voltage in the molten metal secondary circuit to overcome the contact resistance between loose pieces of scrap metal charged into the channel without molten metal to complete a circuit all around the channel. They operated at comparatively low single turn voltages of around 5 to 10 volts and at high amperages. These earlier furnaces were started by placing a solid ring of metal in the channel of the furnace and slowly and carefully heating it until it finally melted. Often the ring would crack or melt at one place and the voltage would be insufficient to cause the current to continue to flow. A new ring would then have to be put in. Sometimes these furnaces were started by pouring molten metal into the secondary channel and heating this by the low induced voltage current. Thus it was not possible, prior to my discovery described herein, to throw loose scrap such as steel punchings into a chamber of an induction furnace and cause current to flow thru the secondary circuit including this loose scrap and melt it.

In the type of induction furnaces at present known to the art wherein an annular channel for receiving the metal charge forms a secondary circuit and is surrounded by an induction coil connected in the primary circuit, as the channel becomes filled with metal and the current increased by reason of the decreased resistance in the secondary circuit the power factor becomes so low that further increase in the usual low voltage results only in increasing the current out of phase with the voltage without increasing the heat generated within the channel. This difficulty my invention proposes to overcome by providing passages of relatively small cross-section in the annular channel where the channel traverses the field of the primary circuit and increasing the voltage in this secondary circuit. This results in the attainment of a high power factor and causes arcing between the individual particles of the cold scrap metal charge to enable starting of the furnace without the preliminary introduction of a quantity of molten metal or a solid metal ring to initially provide a closed secondary circuit.

My invention has for one of its provisions the overcoming of the "pinch effect" which tends to rupture the flow of molten metal when subjected to high current densities. By inducing a relatively high arcing voltage in the secondary circuit composed of the metal charge any tendency of the circuit to be interrupted by reason of pinching off of the molten metal stream is avoided by the formation of an arc across the rupture.

The induction of current may be by means of a magnetic core and primary winding thereon, but I provide a core of sufficiently large cross sectional area to carry the flux required to induce the relatively high and arcing voltages in a single turn circuit around a magnetic core. These single turn voltages may be as high as 300 volts or more, but in small furnaces I utilize voltages of from 20 to 50 volts in the single turn secondary circuit to advantages.

I have discovered that by utilizing the relatively high voltages described herein in a single turn induction furnace secondary circuit, that in certain forms of my invention I secure improved operation by including one or more electrodes in the circuit and I may operate so that these electrodes form part of the single turn secondary circuit, or I may and do in certain cases utilize these electrodes to supply separate current to the charge.

In the operation of my furnace where it is rocked, I have discovered a simple means of combining a rocking and a tilting mechanism with the same apparatus. I have discovered a combination in which I use a tilting cylinder mounted on the foundation so as to allow for movement about a shaft at the base of the cylinder and having a piston rod which serves to connect to and tilt the furnace over, and furthermore, by providing a small cylinder on the furnace end of the rod, and also a piston on both ends of the rod, I can by means of the small cylinder and top piston, provide a short reciprocating movement for rocking the furnace and also provide means for more extended movement required for tilting the furnace.

I have found that I can still further apply my discovery to the melting of certain special metals, such as aluminum and zinc and lead, and in this form of my invention I apply relatively higher voltages thru secondary circuits including resistor elements forming part of the circuit. Thus, in melting aluminum, where the lightness of the metal results in bubbling up,—a sort of modified pinch effect—I use a hollow tube, for example graphite, forming part of the single turn secondary circuit, and so proportion the resistance of this tube in relation to that of the metal passing thru it as to avoid the bubbling and add the necessary heat to the aluminum. In melting such metals, and especially zinc and lead, I may use a metal container forming part of the secondary circuit and containing the molten metal. Thus as a galvanizing pot I may use two main chambers of steel connected by relatively small tubes of steel or iron and encircling magnetic cores, so as to induce current in both the tube and in the metal contained in it; and I may use the container as the preliminary heating element to start the operation before the contained zinc or other metal is melted inside it.

My invention is not limited to the melting of scrap metal for I have discovered that by the method and means of my present invention ore charges and other materials may be advantageously heated and melted and treated. I have also discovered that by means of a high E. M. F. of the magnitude required in arc furnace circuits, I may advantageously apply electric heat for melting cold charge in a melting chamber whereby this relatively high E. M. F. is utilized between the ends of the molten metal portion of the single turn secondary to heat the charge in that location. In this form of my invention there are a number of important features, including the use of a sloping hearth to limit the completion of the molten metal circuit clear around the core and the provision for water cooling the core and the hearth portion which slopes or which forms an elevated part or bridge between the ends of the molten metal part of the secondary. The transformer design provides means for limiting short circuit currents thru the metal in case they occur, by the reactance effect. Electrodes also may be used, either as part of the single turn secondary circuit or independently, or not at all. It is the ability to provide a relatively high E. M. F. in this circuit which makes possible the improvements I have disclosed.

The use of a high E. M. F. of the magnitude of an arcing E. M. F. is a special feature of my invention. For 60 cycle current and with transformer iron which will vary 60,000 lines per square inch in flux density, the single turn secondary voltage per 100 square inches of core area will be approximately 15 volts, and for 80,000 lines about 20 volts. Thus if it is desired to induce a single turn secondary voltage of 40 volts, at the higher flux density, the core area necessary will be about 200 square inches in cross sectional area. Lower voltages as may be required for operation without arcing E. M. F's. can be provided for by additional turns on the primary and taps for different secondary voltages; or different voltages may be applied to the primary winding.

Figure 2:
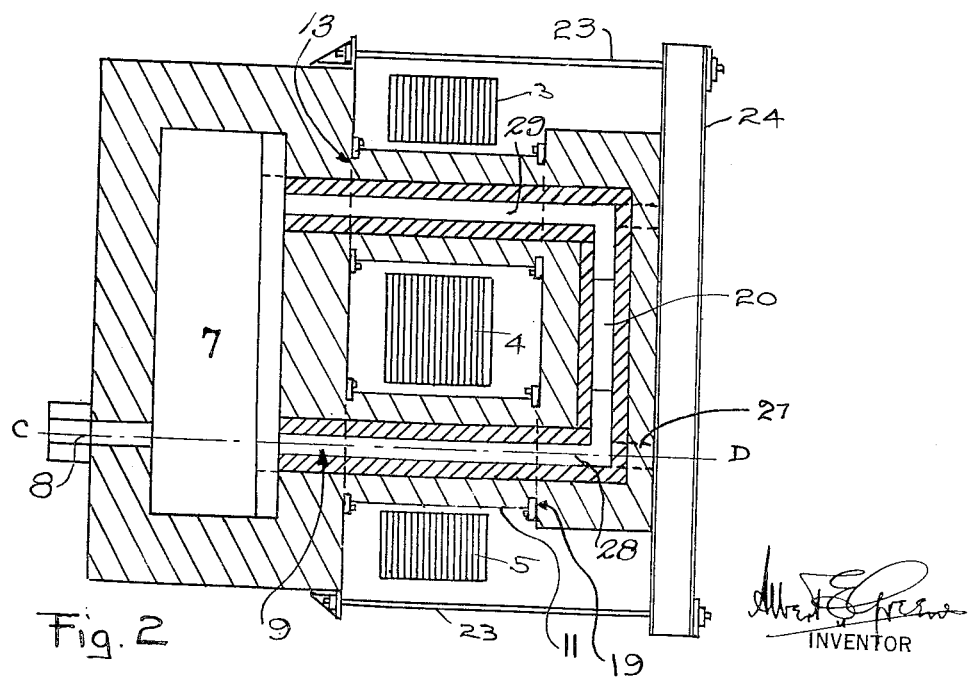

Various details and forms of my invention are illustrated in the annexed drawings in which Fig. 1 is a sectional elevation of one embodiment of my invention and Fig. 2 is a plan view in section of the furnace of Fig. 1.

Figure 3:
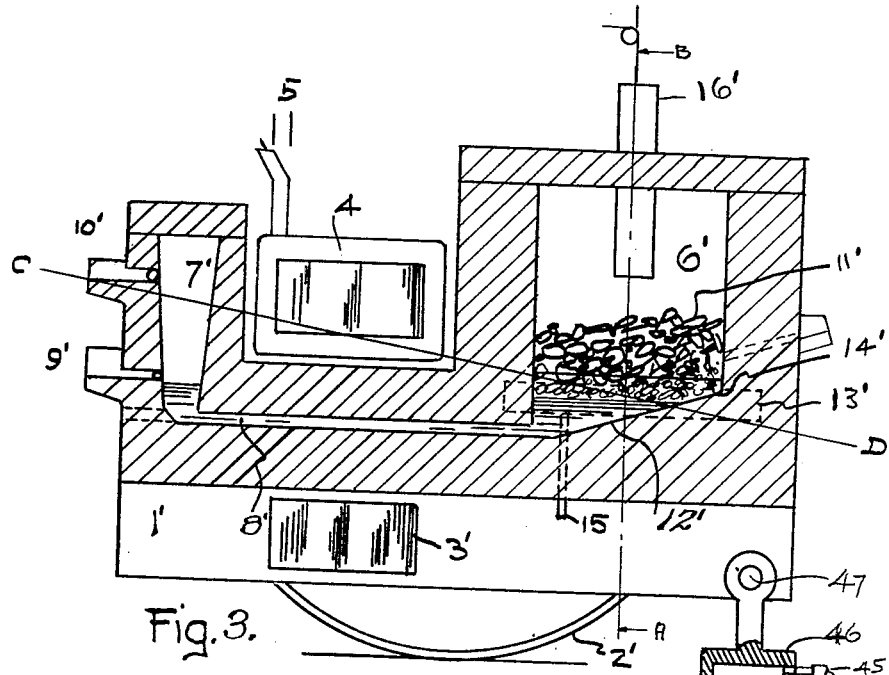

Fig. 3 is a sectional elevation view of a form of my invention wherein a high single turn secondary voltage is applied and where loose charge and scrap can be melted in accordance with my invention, and where molten slag can be kept molten and heated by means of the high secondary E. M. F.

Figure 4:
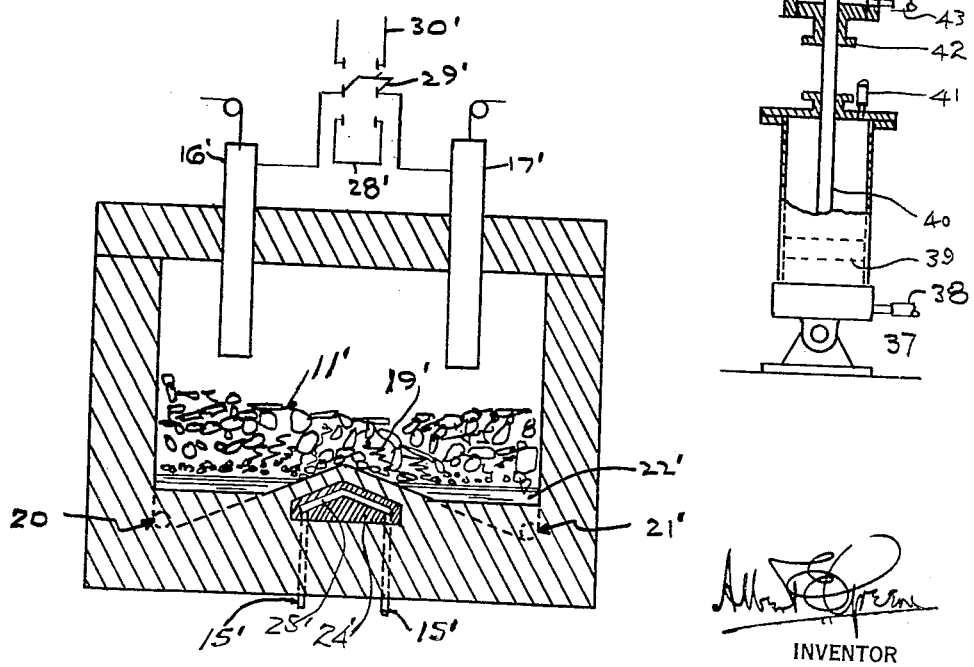

Fig. 4 is a sectional elevation view thru the line AB of Fig. 3 and shows the slag bath heated by the high secondary single turn E. M. F., independently of electrodes.

I will now describe the different embodiments shown in these several drawings and the details therein.

Referring first to Figs. 1 and 2, there is shown in these figures an induction furnace for melting and heating molten metal. This furnace comprises a magnetic core 1 supported on the furnace frame work. It has a primary winding shown diagrammatically at 2 by means of which a relatively high voltage may be induced in the secondary circuit formed by the annular channel 9. The core legs are shown in section at 3, 4 and 5 in Fig. 2. A main chamber 7 is formed in the refractory lining 6. A spout is shown at 8. One of the induction channels is indicated at 9, opening into the main chamber at 10. The connecting channel container 11 holds the refractory material 15 inside of which is a resistor tube with the hole 14 thru it. The connecting tube member joins with the main chamber at 13 and with the opposite reservoir chamber at 12. The induction single turn channel is shown at 16 in the back part of the furnace and a reservoir chamber 20 is indicated in dotted lines above. The furnace is tiltable on a rocker 18. A member 17 of material which will protect the core from molten metal in case of a run out is shown. This may be transite asbestos wood. The insulating members between the metal shell 11 and the other parts of the furnace shell are indicated as at 19. A cover 21 is provided for the reservoir chamber 20 and a cover 22 for the main chamber. The back part of the furnace is removable. It is held in place against the ends of the tubes by means of bolts 23 shown in Fig. 2 and a structural member 24. This latter may be removed in order to get at the openings into the tubes shown at 27. A tilting mechanism may be connected to the rockers at 25. An electrode 26 is shown entering the chamber 7.

The induction furnace shown in these Figs. 1 and 2 operates either on cold charge to melt it or with molten metal. A core encircles each of the connector tubes 28 and 29. When the chamber of the furnace contains metal which fills the connecting tubes, and current is applied to the primary winding on the cores, current will flow thru the molten metal single turn secondary circuits. The amount of current will be regulated by means of the voltage.

In order to start this furnace with cold scrap I may utilize the resistor tubes shown. These may be made, for example, of graphite. If the furnace is used to melt aluminum, for example, I may allow the metal to solidify in the graphite tubes so that when the furnace is cold there is a metal circuit within the tubes and also a circuit around the cores of graphite. The relative resistance of the graphite and the metal is regulated so as to provide a considerable portion of the heat in the graphite proper, and to prevent too great a current in the aluminum. In as much as the current flows around the circuits thru the graphite, there does not need to be a complete unbroken circuit of aluminum. Thus the contraction of the aluminum when it freezes may break the circuit, but this will not prevent the operation of the furnace because the current will flow thru the graphite.

The furnace chamber may be charged with cold scrap aluminum and the heating started. Aluminum scrap is also preferably charged into the chamber 20. As the graphite heats up the aluminum also heats and melts. The pressure of the metal in the outer chambers is preferably maintained well above the level of the top of the tubes, that is the top of the hole thru the graphite tubes. This lessens the tendency to pinching.

The furnace may be rocked in any suitable manner, as for example in accordance with my invention described in my copending application for patent, Serial No. 455,601.

I have shown the main chamber 7 constructed so that metal may be melted in it by means of electrodes without entering the tubes, when this is desired.

I have shown insulating members 19 between the ends of the tube containers and the shell of the furnace, thus preventing a circuit around thru the furnace shell. These insulating members may be thin mica or transite asbestos wood.

I have made the straight tubes of silica with a binder such as clay or molasses water or silicate of soda. I have also used mixtures of fire clay and alumina. I have also used alumina-silica mixtures and also chrome, magnesite and other refractories.

In repairing the inside of the tubes, I may remove the structural members at the back of the furnace and place a pipe or bar inside the tubes and pour in refractory material or carbon paste around the pipe, allowing it to set and then withdrawing the pipes and closing up the opening into the channel, as indicated at 27 in Fig. 2.

Referring now to Figs. 3 and 4, I have shown in these illustrations a modification of my invention where a high single turn induced secondary voltage is advantageously applied for the melting of cold charge, either scrap or ore. Thus this form of my invention may serve to melt cold scrap metal charged into the chamber of the furnace, or the single turn voltage may be applied so as to heat a slag bath into which the charge comes and is smelted or heated.

The furnace consists of a frame 1' mounted on a rocker 2' and supports a magnetic core or cores indicated at 3'. The primary coil is shown at 4'. The primary circuit is completed by means of the switch 5' and the size of the core and value of the primary supply voltage are selected to meet the desired end and the value of the single turn secondary induced voltage is thus controlled.

The furnace has a main chamber 6' in refractory material and an auxiliary or reservoir chamber 7' and connecting tubes as at 8'. The metal in these tubes and the chamber 7' forms part of the circuit and it is completed in the chamber 6', either thru the scrap, or thru the scrap and the electrodes 16' and 17'; or thru a slag bath indicated at 22'.

In the sectional view in Fig. 4 I have shown a water cooling member 24' having a water cavity 25' and inlet and outlet pipes 26' and 27' for cooling water. This member serves to maintain the refractory bridge which separates the metal of the two ends of the secondary circuit. This member is shown at 13' in Fig. 3 and the top of the refractory is indicated at 14'. The pipe leading from the water cooler member is shown in Fig. 3 at 15'.

The electrodes shown diagrammatically at 16' and 17' may be used in a specially advantageous way. They may serve to complete the single turn circuit thru the charge and I have shown a switch at 29' which may connect these electrodes either to a supply circuit independent of the furnace or from a winding on its core, or alternately to short circuit them so that they serve to carry the current from one side of the bridge of the hearth to the other side. These electrodes are shown relatively small in diameter, but they may be made relatively large so as to cover quite an area of the scrap charge. Thus in melting cold scrap where the circuit is completed from the metal in the tube 20' by passing thru the scrap and back to the metal in tube 21', the current may pass thru the scrap indicated at 11' and pass directly from one side to the other, forming arcs as indicated at 19', or it may pass thru the scrap into the electrode 16' and back thru the electrode 17', likewise forming arcs. The voltage of this circuit may be controlled as desired from a very low voltage up to as much as 300 volts which can be obtained with a relatively large magnetic core. When forming arcs thru the scrap as at 19', the water cooling member protects the hearth from wear and enables it to withstand the high heat. However, I may operate this furnace and process by forming slag as a bath to connect between the metal at the ends of the tubes 20' and 21'. Thus I may do what has not been heretofore accomplished, namely, I may supply a relatively high voltage around the single turn circuit sufficient to cause the current to flow thru a slag bath joining parts of the secondary circuit. And I can do this without the use of electrodes. It is thus possible to provide electric heat in a materially less expensive manner than heretofore. This slag bath can be used for smelting purposes and the charge can enter from above and drop on the slag bath and be heated and smelted. Scrap metal, and particularly volatile metal can likewise be thus treated.

The tilting cylinder illustrated in the Fig. 3 comprises in reality two cylinders mounted with a single piston rod, and a piston in each cylinder. The lower cylinder is for tilting the furnace and the upper cylinder is for giving it a limited rocking motion. The base of the main cylinder is shown at 37 and it is mounted on a pin to allow for the movement when tilting the furnace. The piston rod is shown at 40 with a piston 39 shown in dotted lines in the lower cylinder and another piston on the other end of the same rod at 44 for operation within the upper cylinder, which latter is shown in section at 46, with its gland at 42. Inlet and outlet pipes for both cylinders are shown at 38, 41, 43 and 45, and air or other fluid may be used, or water may be used. The upper cylinder is mounted on a pin 47 connected to the frame of the tilting furnace of Fig. 12. In operation this combination tilting apparatus serves to give a short movement to the shell by means of the double acting piston 44 and this movement may be kept up mechanically as for example by means of a rotated 4-way valve which alternately applies pressure first to one side and then to the other of the piston 44. This valve may be operated by a motor or other means may be used and the speed of reciprocation controlled. When the inlet and outlet pipes of the lower cylinder are both closed by suitable valves, the piston on the lower end of the piston rod can be held approximately stationary and thus serve to connect the piston directly with the base bearing as it were. On the other hand, when it is desired to tilt the furnace for pouring its contents, the small cylinder operation can be stopped and the pressure admitted in the large cylinder to tilt the furnace over to the desired extent.

The line C D in Fig. 3 illustrates the position of the top surface of the metal when the furnace is tilted so as to retain more metal in the chamber and to avoid short circuiting the secondary by a solid or molten ring of metal all the way around.

It is not necessary to maintain the metal in the induction tubes molten. The voltage may be sufficiently high and the current low enough so that this part of the circuit around the core, particularly away from the molten slag, may be below the solidifying temperature, and the metal which collects will then collect on either side of the refractory hearth bridge and not complete the single turn circuit. The furnace can of course be operated without rocking it, and the conductor or metal in the tubes may even be kept solid by water cooling, when desired, or by simple radiation. It is understood that altho I have shown this improvement in a certain shape of furnace, my invention is by no means limited to that kind of a furnace, but the induction circuits may be applied from the bottom or side or end and the main hearth may be of such shape as will most easily suit the process under operation.

Where I use a separate magnetic circuit around different parts of the same single turn secondary circuit, it is understood that I may provide a separate primary coil on each core member and these two coils may be interconnected electrically so as to operate either in series or in parallel across the supply line voltage, and thus serve as a means of secondary induced voltage control independently of taps on those coils, which also may be used.

In the construction of furnace illustrated in Figs. 1 and 2, I may hold the two main chambers together by any suitable pressure means, such as the bolts 23. When a new tube is to be put in place, the pressure is released so as to lift away the back chamber or either of them, as for example by means of a crane and hooks on the furnace shell. The bolts thru the insulating members like that shown at 19 in Fig. 1, are loosened to release the tube so that it can be taken out. When the new tube such as the one in Fig. 3 is ready to go in place, the ends are preferably plastered with plastic refractory or mud so that this is squeezed out away from the hole thru the tube when it is pressed between the two chambers. When this is done, it is preferable to have a bar of pipe inside the hole to prevent the plastic material closing the hole.

I may, however, repair the inside of the tubes without removing them from their position between the chambers by placing inside the hole in the refractory a pipe or bar the size the hole should be and tilting the furnace and pouring into the opening between the pipe and the refractory fluid mud or fluid with mud of refractory nature in suspension so that it fills up the space which has been corroded.

The magnetic core of Fig. 2 is preferably made in two separate parts and each part has its separate primary coil as indicated at 2. The preferred location of these coils is above the tubes. Then in event of a run out the coil is not damaged by molten metal.

The electrode shown in dotted line in Fig. 1 illustrates how the furnace may be operated in case it is desired to heat the metal with electrode current with the furnace tilted over so that the metal is not in the tubes.

In the modification where a carbon resistor tube is used I may make a constricted portion of small diameter in the tubes to limit the current in the metal contained.

It is important to provide a sufficient magnetic core area to permit the relatively high single turn secondary E. M. F. necessary for carrying out my invention. As mentioned the core may be of sufficient flux capacity to induce a single turn voltage of as much as 300 volts. Where it is desired to utilize induction heating by means of high secondary induced E. M. F. and to heat a circuit including molten slag or unreduced material as well as molten metal, voltages of 50 to 75 volts across the molten slag portion of the secondary may be used. This induced voltage may be regulated, adjusted and controlled by means described in my Patent No. 1,662,149 of March 13, 1928, either without stopping the flow of secondary current or by change of taps with the current stopped.

It is understood that the cross sectional shape of the secondary channels may be other than round, and that the various combinations described herein may be further modified without getting away from the invention.

Altho I have shown in Fig. 1 a furnace in which solid tubular resistors are included, it is to be understood that the straight channel sections there illustrated may be made of refractory material without the hollow resistors.

What I claim is:

1. An electric induction heating furnace comprising a heat refractory furnace body having a chamber for a charge, an annular channel of small cross-section communicating with the chamber forming a closed secondary circuit and permitting the passage of the molten charge therethrough, a primary coil associated with said secondary circuit, the coil and secondary circuit being so constructed and arranged that a relatively high voltage is induced in said secondary circuit.

2. An electric induction furnace comprising heat refractory furnace body having a chamber for a charge of loose scrap electro conductive material, an annular channel of relatively small cross-section, said channel forming a closed secondary circuit and permitting the passage of the molten charge therethrough, a primary coil associated with said secondary circuit the coil and secondary circuit being so constructed and arranged that a voltage of sufficient magnitude to cause arcing between the individual particles of the charge is induced in said secondary circuit.

3. An electric induction furnace comprising heat refractory furnace body having a chamber for a charge, an annular channel of relatively small cross-section communicating with the chamber said channel forming a closed secondary circuit and permitting the passage of the molten charge therethrough, and a primary coil associated with said secondary circuit and arranged to induce a relatively high voltage in the secondary circuit, said chamber being provided with a low partitioning bridge for normally projecting into the stream of the molten charge.

In testimony whereof, I hereunto subscribe my name this 22nd day of November, A. D. 1928.

ALBERT E. GREENE.